United States Patent [19]

Phillips, II et al.

[11] 4,300,726
[45] Nov. 17, 1981

[54] HARVESTER SPOUT CONTROL DEVICE

[75] Inventors: Frederick W. Phillips, II, Leola; Edward H. Priepke, Stevens, both of Pa.

[73] Assignee: Sperry Corporation, New Holland, Pa.

[21] Appl. No.: 107,675

[22] Filed: Dec. 27, 1979

[51] Int. Cl.³ .............................................. B02C 18/22
[52] U.S. Cl. ................................. 241/101.7; 241/222; 406/39; 406/166
[58] Field of Search ...................... 56/13.9, 14.9, 15.8; 406/165, 166, 39, 41; 414/335; 241/101.7, 60, 222

[56] References Cited

U.S. PATENT DOCUMENTS 3,451,725  6/1969  Waldrop ............................. 406/166
4,223,846  9/1980  Priepke et al. ....................... 241/60

Primary Examiner—Mark Rosenbaum
Attorney, Agent, or Firm—Larry W. Miller; Frank A. Seemar

[57] ABSTRACT

A control device for the discharge deflection spout on a forage harvester is disclosed wherein the discharge end of the spout is rotated in a substantially horizontal plane even though the base of the spout is rotated about an axis defined by the blower which is tilted at an acute angle to the vertical.

26 Claims, 5 Drawing Figures

000
HARVESTER SPOUT CONTROL DEVICE

BACKGROUND OF THE INVENTION

The present invention relates generally to forage harvesters and, more particularly, to a discharge spout control device.

Generally, forage harvesters chop crop material into relatively small particles for storage and subsequent feeding to livestock. Precision type forage harvesters generally include a rotating cutterhead having a plurality of knives mounted thereon. Crop material is fed across a stationary shear bar which cooperates with the rotating cutterhead knives to cut the crop material into relatively small particles by a shearing action. The reduced crop material is normally conveyed to a rotary forage blower which engages the reduced crop material and imparts sufficient energy thereto for discharge thereof upwardly and rearwardly through a spout which directs the flow of crop material into a trailing storage vehicle.

Normally, the forage blower is inclined in a vertically oriented plane and includes an upwardly directed discharge tube. The discharge deflection spout is rotatably mounted on the discharge tube and is curved so that the crop material is discharged in a substantially horizontal direction. A rotation mechanism is connected to the spout for rotation thereof to direct the flow of discharge crop material in the desired direction.

As can be seen in Application for U.S. Pat. Ser. No. 026,499, entitled "Forage Harvester," filed Apr. 3, 1979 in the names of E. H. Priepke and R. A. Wagstaff and issued on Sept. 23, 1980 as U.S. Pat. No. 4,223,846, the blower can be tilted out of its normally vertical plane and positioned at least partially underneath the cutterhead to eliminate the need for a separate conveying device between the cutterhead and the blower. However, tilting the plane of the blower out of its normal vertical alignment creates a problem of maintaining a horizontal disposition of the discharge end of the spout upon rotation thereof. Rotating the spout about an axis inclined to the vertical results in the discharge end swinging in an arc inclined from a horizontal plane; therefore, the discharge end of the spout would be moving vertically relative to the ground upon rotation thereof about the discharge tube of the blower.

It is desirable to maintain the flow of discharge crop material at approximately the same elevation so that it can be efficiently directed into the trailing storage vehicle. Furthermore, it is desirable to provide a simple means of adjusting the vertical height of the discharge end of the spout relative to the ground to accommodate various sizes of trailing storage vehicles. Another problem with existing harvester spout control devices is a tendency for the various components to bind while the spout is rotating and, thereby, require heavy forces to rotate the spout.

SUMMARY OF THE INVENTION

It is an object of this invention to overcome the aforementioned disadvantages of the prior art by providing a harvester spout control device which will maintain the movement of the discharge end of the spout in a horizontal plane even though the spout is rotated about an axis inclined at an acute angle to vertical.

It is another object of this invention to provide a simple means for changing the vertical position of the discharge end of the spout relative to the ground to accommodate various sizes of trailing storage vehicles.

It is still another object of this invention to rotate the discharge end of a forage harvester spout about a vertical axis while rotation of the spout itself is about an axis inclined at an acute angle to the vertical.

It is an advantage of this invention that a tilted blower can be utilized while maintaining the movement of the discharge end of the spout in a horizontal plane to facilitate loading of the discharge crop material into a trailing storage vehicle.

It is a feature of this invention that binding of the rotating components is eliminated since all components are free to pivot.

It is a further object of this invention to provide a forage harvester spout control device which is durable in construction, inexpensive in manufacture, facile in assemblage, and simple and effective in use.

These and other objects, features and disadvantages are accomplished according to the instant invention by providing a spout control device for a forage harvester wherein a control device for the discharge deflection spout on a forage harvester wherein the discharge end of the spout is rotated in a substantially horizontal plane even though the base of the spout is rotated about an axis defined by the blower which is tilted at an acute angle to the vertical.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
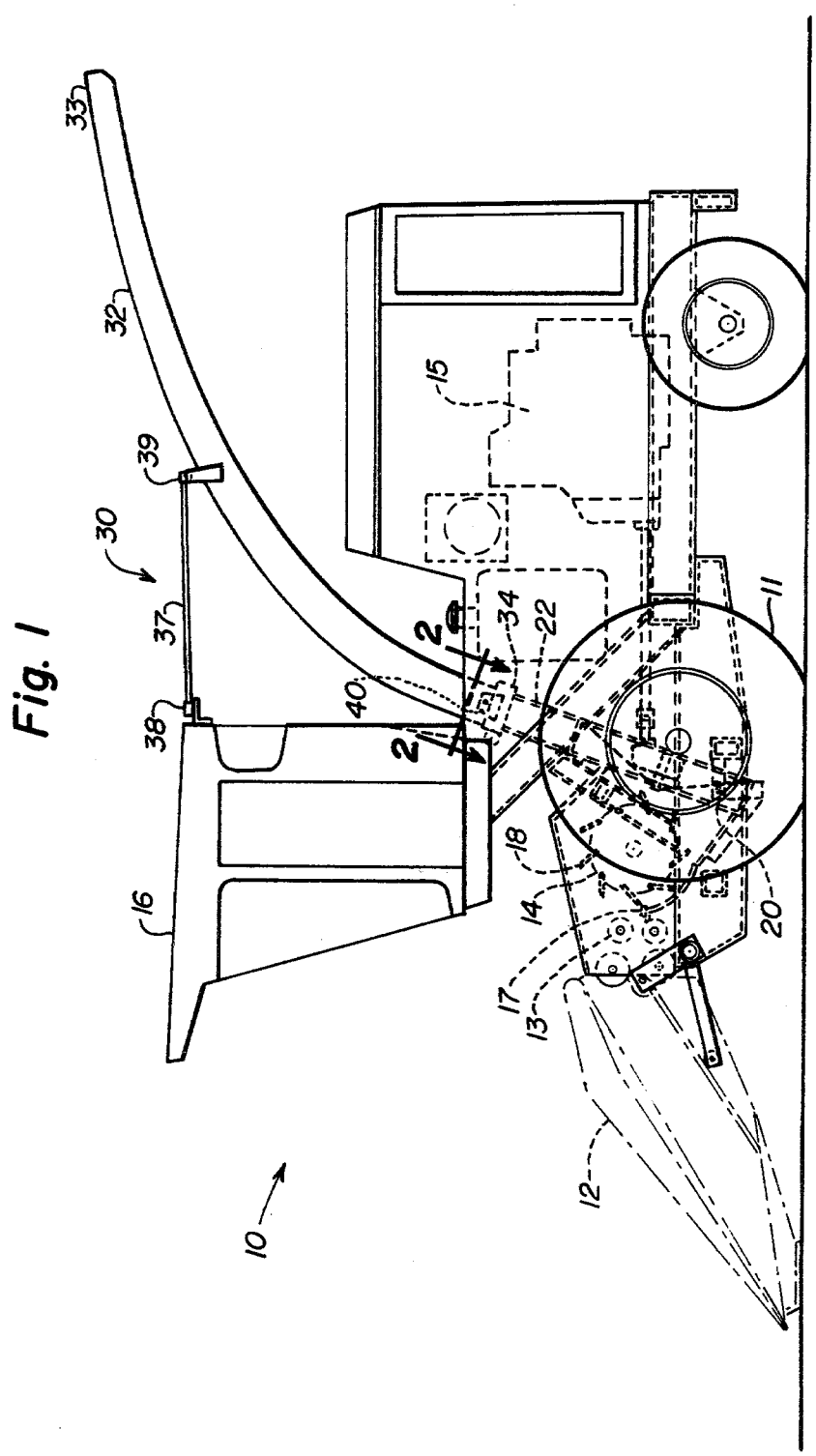
FIG. 1 is a side elevational view of a precision-type self-propelled forage harvester incorporating the principles of the instant invention.

Referring now to the drawings and, particularly to FIG. 1, a side elevational view of a self-propelled precision type forage harvester can be seen. Left and right references are used as a matter of convenience and are determined by standing at the rear of the machine facing the forward end, the direction of travel.

The forage harvester 10 includes a mobile frame 11 driven by a power device 15. A crop gathering header 12 is disposed at the forward end of the forage harvester 10 for collecting the crop material, consolidating it and discharging rearwardly through a set of infeed rolls 13 toward the rotating cutterhead 14. The infeed rolls 13 generally present the crop material in a mat form across the shear bar 17 which cooperates with the knives 18 mounted on the rotating cutterhead 14 to comminute the crop material by a shearing action. A cab 16 is positioned above the header 12 so that the operator may have a full view of the harvesting operation occurring below and forward of him.

A rotary blower 20 is mounted rearward of the rotating cutterhead 14 and is aligned in a plane tilted at an acute angle to the vertical. The blower 20 includes an infeed portion (not shown) which is positioned in close proximity to the cutterhead 14 so that a separate conveying device is not necessary to feed material between the cutterhead 14 and the blower 20. The blower 20 imparts energy to the reduced crop material entering therein for discharge upwardly and rearwardly through the blower discharge tube 22.

A discharge deflection mechanism 30, consisting primarily of a curved spout 32, is mounted to the blower discharge tube 22 to selectively direct the stream of crop material being discharged therefrom. The discharge deflection mechanism 30 further includes a base member 34 mounted on the blower discharge tube 22 and a remote discharge end 33. As can be seen in FIG. 1, the spout 32 is curved so as to deflect the discharge crop material into a substantially horizontal direction. The elongated support link 37 includes a pivot 39 and a pivot 38 interconnecting the spout and the frame of the forage harvester, respectively, the pivot 38 being attached to the frame 11 at the rear of the cab 16.

Figure 2:
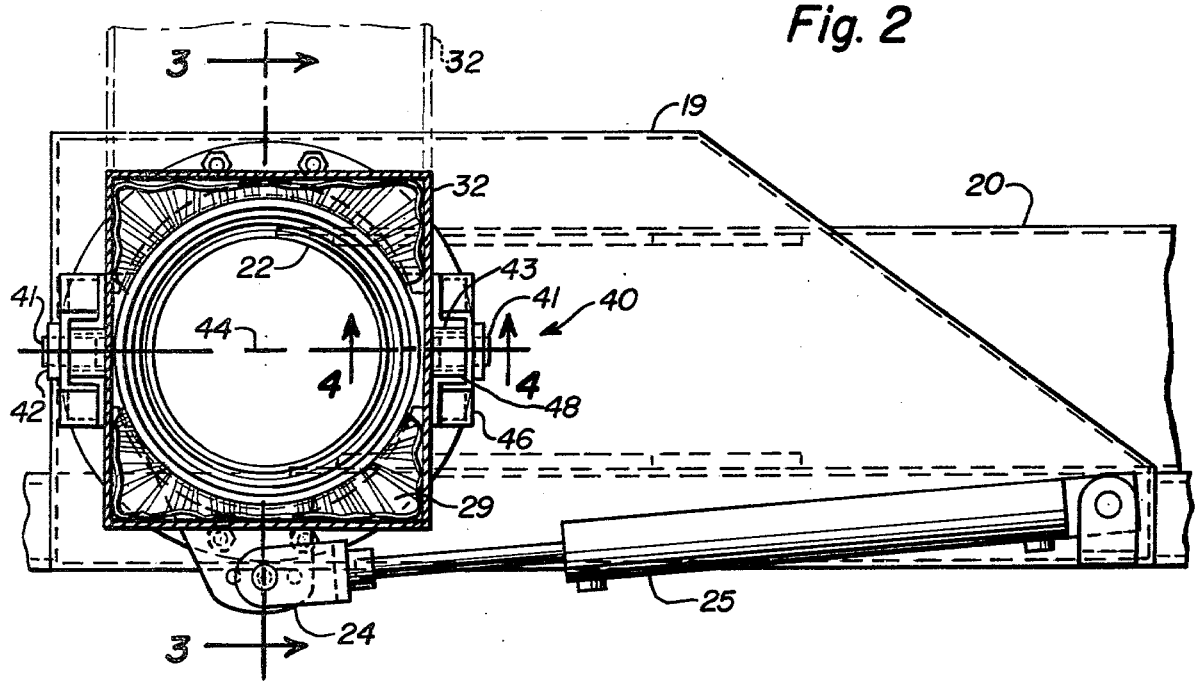
FIG. 2 is a cross sectional view of the discharge deflection spout taken along lines 2—2 of FIG. 1.

Referring now to FIG. 2, a cross sectional view of the spout 32, illustrating the principles of the instant invention, can be seen. It should be noted that the cross sectional view seen in FIG. 2 is taken perpendicular to the blower discharge tube 22 and, therefore, is not in a horizontal plane. The spout 32 is connected to the blower discharge tube 22 extending upwardly from the blower 20. Means for rotating the spout 32 is provided by the hydraulic cylinder 25 which is connected to the spout by the rotation linkage 24. An extension or retraction of the hydraulic cylinder 25 effects a corresponding rotation of the spout 32. Support for the hydraulic cylinder 25 and the spout 32 is provided by the support plate 19.

Figure 3:
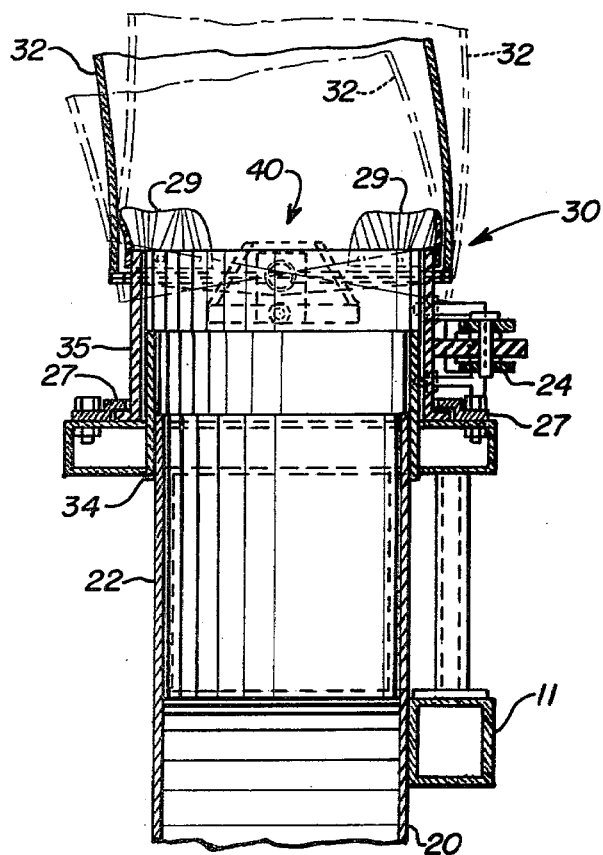
FIG. 3 is a cross sectional view of the spout taken along lines 3—3 of FIG. 2.

Referring to both FIGS. 2 and 3, it can be seen that a pivot means 40 defines an axis of rotation 44 extending through the center of the spout 32. The pivot means 40 permits movement of the spout 32, as is seen in phantom in FIG. 3, to effect a change in elevation of the discharge end 33 of the spout 32. The pivot means 40 includes bearings 48 on either side of the spout 32 mounted around a pin 41 within the rotating cuff 43 and is supported by the support housing 46. Further description of the pivot means 40 can be found below with reference to FIG. 4. It should be noted that providing the axis 44 through the center of the spout 32 is the preferred embodiment. Providing the axis 44 at either the forward or rearward edge of the spout transverse to the line of travel could also be operable embodiments.

As can best be seen in FIG. 3, the discharge deflection means 30 also includes a base member 34 and a rotation collar 35 for connecting the spout 32 to the blower discharge tube 22. The base member 34 is affixed to the blower discharge tube 22 and is stationary therewith. The rotation collar 35 is rotatably supported by the base member 34. The rotation linkage 24 is affixed to the rotation collar 35 for rotation thereof about an axis defined by the linear blower discharge tube 22. A clamp 27 allows rotation of the rotation collar 35 yet prevents the rotation collar 35 from separating from the base member 34. The pivot means 40 pivotally connects the spout 32 to the rotation collar 35. A seal 29 may be provided between the spout 32 and the rotation collar 35 to prevent crop material from leaking from the deflection means 30.

During operation, the base member 34 is stationary with the blower discharge tube 22. The rotation collar 35 is capable of rotative movement around the base member 34 upon selective manipulation of the rotation linkage 24 and hydraulic cylinder 25. The spout 32 is capable of rotative movement with the rotation collar 35 and of pivotal movement about the axis of rotation 44 by reason of the generally horizontally disposed pivot means 40.

Figure 4:
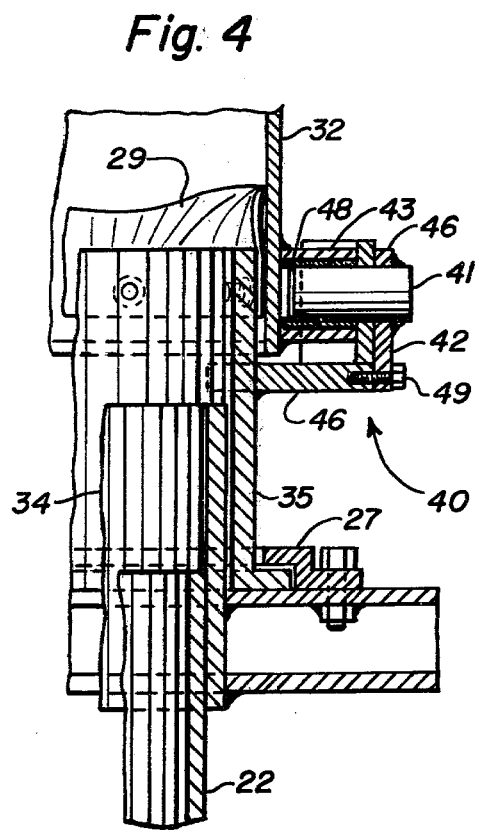
FIG. 4 is an enlarged cross sectional view of the pivot means which also shows the connection of the spout to the blower discharge tube as taken along lines 4—4 of FIG. 2.

Referring now to FIG. 4, a more detailed description of the pivot means can be had. This enlarged view also shows the relationship between the blower discharge tube 22, the base member 34, the rotation collar 35, the clamp 27, the pivot means 40 and the spout 32. The cuff 43 is affixed to the spout 32 and includes a bearing 48 therewithin. The cuff 43 and bearing 48 rotate about a pin 41 which is affixed to the face plate 42 and, in turn, is supported by the pivot support housing 46. The spout 32 can be disconnected from the rotation collar 35 merely by disconnecting one or more set screws 49 and withdrawing the pin 41 and attached face plate 42 from within the cuff 43. It should be noted by one skilled in the art that the entire removal of the spout 32 entirely from the forage harvester 10 would necessarily involve the disconnection of the elongated support link 37.

Figure 5:
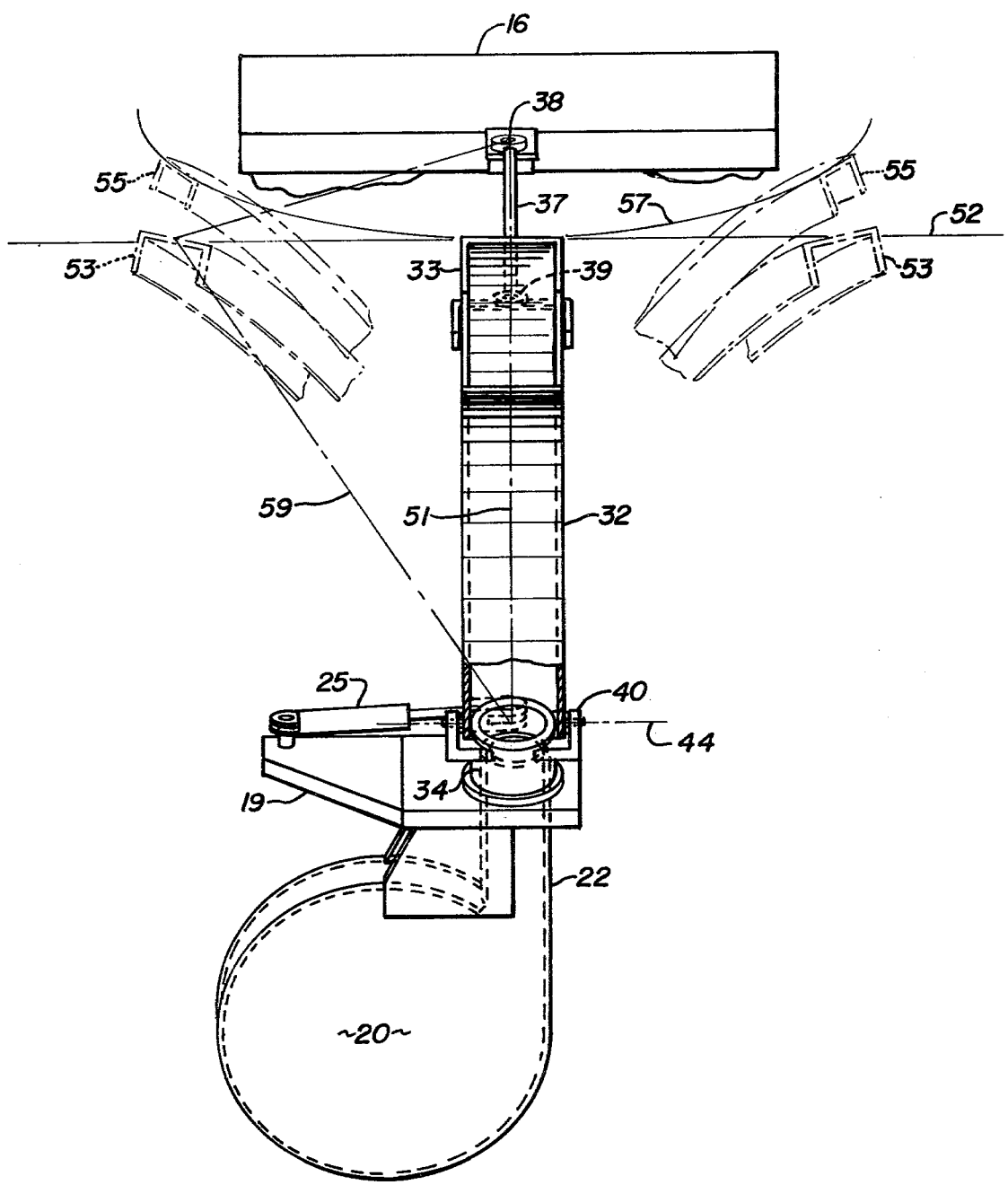
FIG. 5 is a partial rear view of the forage harvester seen in FIG. 1 illustrating the blower, the spout and the principles of the instant invention, the position of the discharge end of the spout upon rotation thereof being shown in phantom both according to the principles of the instant invention and without benefit of the instant invention.

The primary advantage of the instant invention can readily be seen in FIG. 5. Placement of the pivot 38, where the elongated support link 37 is connected to the frame of the cab 16, in vertical alignment with the axis 44 of the pivot means 40 provides for a vertical axis of rotation 51 therebetween. The pivot connection 39 of the elongated support link 37 on the spout 32 then establishes a fixed distance triangle 59. The horizontal pivot means 40 will allow for a continuous vertical adjustment of the discharge end 33 simultaneous with the rotation of the spout 32 about the inclined axis corresponding to the linear blower discharge tube 22. As can be seen, the discharge end 33, upon rotation to either the right or the left, as indicated by the numeral 53, is maintained within the horizontal plane 52 in response to the maintenance of the fixed triangle 59 by the pivot means 40. Without benefit of the pivot means 40, the discharge end 33 would be pivoted in an arc 57 out of the horizontal plane 52. The numeral 55 indicates the potential position of the discharge end 33 upon the rotation of the spout 32 along arc 57 to the right and left.

It should be realized by one skilled in the art that for the discharge end 33 to rotate in a true horizontal plane, the pivot connection 39 would have to be directly at the discharge end 33. The connection of the elongated support link 37 along the spout 32 at point 39, as seen in FIGS. 1 and 5, is a matter of convenience and economy which still results in the movement of the discharge end 33 in a substantially horizontal plane. It will be noted that the discharge end at numeral 53, when rotated to the left or the right, is slightly tilted as a result of the pivot connection 39 being somewhat forward of the discharge end 33.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. A forage harvester for harvesting crop material by comminution thereof comprising:

a frame adapted for movement across a field;

a crop comminution means supported by said frame for reducing crop material into relatively small particles;

a crop discharge means proximate to said crop comminution for the discharge of said reduced crop material away from said crop comminution means;

an upwardly inclined discharge deflection means cooperable with said crop discharge means for directing the flow of reduced crop material therefrom, said deflection means having a lower base member connected to said crop discharge means, a distal discharge end elevated above said lower base member and a centerline extending from said crop discharge means through said base member to said discharge end substantially corresponding to the path of travel of said discharged crop material, said centerline having a substantially linear portion extending along said crop discharge means to said base member, said substantially linear portion being disposed at an acute angle to a vertical line projecting through said base member;

a rotation means mounted on said discharge deflection means proximate to said base member for the selective rotation of said discharge deflection means about an axis corresponding to said substantially linear portion of said centerline;

a pivot means mounted on said discharge deflection means proximate to said base member to permit a vertical movement of said discharge end;

a support means pivotally interconnecting said discharge deflection means and said frame to maintain a preselected vertical position of said discharge end while allowing movement thereof in a horizontal plane, said support means including a pivotal connection with said frame being in substantially vertical alignment with said pivot means, whereby, upon rotation of said discharge deflection means by said rotation means, said discharge end is automatically rotated in a substantially horizontal plane; and drive means for powering said crop comminution means, said crop discharge means and said rotation means.

2. The forage harvester of claim 1 wherein said discharge deflection means includes an elongated spout having a passageway therein for the discharge of said crop material therethrough.

3. The forage harvester of claim 2 wherein said spout is curved from said base member to said discharge end such that crop material is discharged therefrom in a substantially horizontal direction, said crop discharge means including a linear discharge tube projecting upwardly to connect with said spout at said base member, said linear discharge tube coinciding with said linear portion of said centerline and, thereby, defining the axis of rotation of said spout.

4. The forage harvester of claims 1 or 3 wherein said pivot means defines a transverse horizontal axis through the center of said spout at said base portion when said spout is positioned to discharge crop material directly rearwardly of said forage harvester.

5. The forage harvester of claim 4 wherein said crop comminution means includes a rotary cutterhead having knives mounted thereon to cooperate with a substantially stationary shear bar to comminute crop material by a shearing action, said crop discharge means being a rotary blower having a lower infeed portion positioned adjacent said cutterhead, said rotary blower being operable to discharge reduced crop material upwardly through said discharge tube at a sufficient velocity to be propelled through said elongated spout beyond said discharge end.

6. The forage harvester of claim 5 wherein said lower infeed portion of said blower is positioned partially underneath said cutterhead.

7. The forage harvester of claim 6 wherein said support means includes a rigid elongated link pivotally connected to said spout proximate to said discharge end, said rigid link also being pivotally connected to said frame for movement about an axis defined by the vertical line extending downwardly through said pivot means.

8. The forage harvester of claim 7 wherein said elongated link can be selectively shortened or lengthened to vertically position said discharge end relative to said base member.

9. The forage harvester of claim 8 wherein said rotation means includes a hydraulic cylinder selectively operable to rotate said spout.

10. The forage harvester of claim 9 wherein said discharge deflection means includes a seal to prevent crop material from leaking therefrom through the connection between said spout and said discharge tube at said base member.

11. The forage harvester of claim 10 wherein said blower, said linear discharge tube and said linear portion of said centerline are positioned in a plane inclined at an angle approximately 20 degrees from vertical.

12. The harvester spout control device of claim 4 wherein said pivot means includes two bearings mounting said spout to said base member for rotation relative to said base member, one bearing being mounted on either side of said spout in alignment with the other said bearing.

13. In a forage harvester having a frame adapted for movement across a field; a crop comminution means supported by said frame for reducing crop material into relatively small particles; a crop discharge means proximate to said crop comminution means for the discharge of said reduced crop material away from said crop comminution means; and upwardly inclined discharge deflection means cooperable with said crop discharge means for directing the flow of reduced crop material therefrom, said deflection means having a lower base member connected to said crop discharge means, a remote discharge end elevated above said lower base member and a centerline extending from said crop discharge means through said base member to said discharge end substantially corresponding to the path of travel of discharged crop material, said centerline having a substantially linear portion extending from said crop discharge means to said base member; a rotation means mounted on said discharge deflection means proximate to said base member for the selective rotation of said discharge deflection means about an axis corresponding to said substantially linear portion of said centerline; a support means pivotally interconnecting said discharge deflection means and said frame to maintain a preselected vertical position of said discharge end while allowing movement thereof in a horizontal plane; and drive means for powering said crop comminution means, said crop discharge means and said rotation means, the improvement comprising:

a pivot means mounted on said discharge deflection means proximate to said base member to permit a vertical movement of said discharge end relative to said base member, said linear portion of said centerline being disposed at an acute angle to a vertical line projecting through said base portion, said support means including a pivotal connection with said frame being in substantially vertical alignment with said pivot means, whereby upon rotation of said discharge deflection means by said rotation means, said discharge end is automatically rotated in a substantially horizontal plane.

14. The forage harvester of claim 13 wherein said crop comminution means includes a rotary cutterhead having knives mounted thereon to cooperate with a substantially stationary shear bar to comminute crop material by a shearing action, said crop discharge means being a rotary blower having a lower infeed portion positioned adjacent said cutterhead, said rotary blower being operable to discharge reduced crop material upwardly through said discharge tube at a sufficient velocity to be propelled through said deflection means beyond said discharge end.

15. The forage harvester of claim 14 wherein said discharge deflection means includes an elongated spout having a passageway therein for the discharge of said crop material therethrough.

16. The forage harvester of claim 15 wherein said pivot means defines a transverse horizontal axis running through the center of said spout at said base portion when said spout is positioned to discharge crop material directly rearwardly of said forage harvester.

17. The forage harvester of claim 16 wherein said spout is curved from said base member to said discharge end such that crop material is discharged therefrom in a substantially horizontal direction, said crop discharge means including a linear discharge tube projecting upwardly to connect with said spout at said base member, said linear discharge tube coinciding with said linear portion of said centerline and, thereby, defining the axis of rotation of said spout.

18. The forage harvester of claim 17 wherein said support means includes a rigid elongated link pivotally connected to said spout proximate to said discharge end, said rigid link also being pivotally connected to said frame for movement about an axis defined by the vertical line extending downwardly through said pivot means.

19. A forage harvester of claim 18 wherein said elongated link can be selectively shortened or lengthened to vertically position said discharge end relative to said base member.

20. The forage harvester of claim 19 wherein said lower infeed portion of said blower is positioned partially underneath said cutterhead.

21. The forage harvester of claim 20 wherein said blower, said linear discharge tube and said linear portion of said centerline are substantially aligned in a plane inclined at an angle of approximately 20 degrees from a vertical disposition.

22. In a forage harvester having a frame adapted for movement across a field; a blower discharge tube inclined relative to the vertical; a spout having an input end pivotally affixed to said discharge tube and a remote discharge end directing cut crop material upwardly and rearwardly away from said forage harvester; and means for controlling the vertical and horizontal position of said discharge end of said spout relative to the ground, the improvement wherein said means for controlling comprises:

means for connecting said spout to said discharge tube to permit simultaneous movement of said discharge end in at least two independent directions; and means interconnecting said frame and said spout for maintaining movement of said discharge end in a plane, whereby said discharge end rotates about an axis of rotation perpendicular to said plane.

23. The forage harvester of claim 22 wherein said means for connecting has a first axis of rotation inclined relative to the vertical, said first axis of rotation coinciding with said blower discharge tube.

24. The forage harvester of claim 23 wherein said means for connecting also has a second non-vertical axis of rotation substantially perpendicular to said first axis of rotation, both said first and second axes of rotation permitting simultaneous movement of said discharge end relative to the ground.

25. The forage harvester of claim 24 wherein said second axis of rotation is defined by a horizontally disposed pivot means permitting vertical movement of said discharge end relative to the ground.

26. The forage harvester of claim 25 wherein said means for maintaining movement includes a pivotal connection with said frame in substantially vertical alignment with said pivot means.

* * * * *